(12) United States Patent
Kase (10) Patent No.: US 10,139,566 B2
(45) Date of Patent: Nov. 27, 2018

(54) OPTICAL WAVEGUIDE CONNECTOR

(71) Applicant: FUJITSU LIMITED, Kawasaki-shi, Kanagawa (JP)

(72) Inventor: Mariko Kase, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/236,916

(22) Filed: Aug. 15, 2016

(65) Prior Publication Data

US 2017/0052320 A1 Feb. 23, 2017

(30) Foreign Application Priority Data

Aug. 21, 2015 (JP) ................. 2015-164104

(51) Int. Cl.
*G02B 6/32* (2006.01)
*G02B 6/38* (2006.01)

(52) U.S. Cl.
CPC ............ *G02B 6/32* (2013.01); *G02B 6/3861* (2013.01)

(58) Field of Classification Search
CPC ...... G02B 6/3861; G02B 6/3893; G02B 6/32; G02B 6/3853; G02B 6/3869
See application file for complete search history.

(56) References Cited

U.S. PATENT DOCUMENTS

| | | | |
|---|---|---|---|
| 8,876,401 B2 * | 11/2014 | Shiraishi | G02B 6/3861 385/53 |
| 9,201,201 B2 * | 12/2015 | Charbonneau-Lefort | G02B 6/4214 |
| 2003/0231830 A1 | 12/2003 | Hikichi et al. | |
| 2012/0068368 A1 * | 3/2012 | Suenaga | G02B 1/041 264/1.7 |
| 2013/0011100 A1 | 1/2013 | Shiraishi | |

FOREIGN PATENT DOCUMENTS

| | | |
|---|---|---|
| JP | 2003-329877 | 11/2003 |
| JP | 2005-024813 | 1/2005 |
| JP | 2005-092160 | 4/2005 |
| JP | 2005284015 A * | 10/2005 |
| JP | 2013-020027 | 1/2013 |

\* cited by examiner

*Primary Examiner* — Thomas A Hollweg
*Assistant Examiner* — Mary A El-Shammaa
(74) *Attorney, Agent, or Firm* — Fujitsu Patent Center (57) ABSTRACT

An optical waveguide connector including a surface having an insertion hole that is connectable to a waveguide by inserting an end portion of the optical waveguide, the insertion hole having a bottom surface, the bottom surface being capable of being bonded with an end surface of the optical waveguide by using an adhesive, and a first convex portion located on the bottom surface of the insertion hole, the first convex portion including an incident surface that receives light from the optical waveguide, the incident surface being larger than an end surface of a core of the optical waveguide to be inserted.

8 Claims, 12 Drawing Sheets

OPTICAL WAVEGUIDE CONNECTOR

CROSS-REFERENCE TO RELATED APPLICATION

This application is based upon and claims the benefit of priority of the prior Japanese Patent Application No. 2015-164104, filed on Aug. 21, 2015, the entire contents of which are incorporated herein by reference.

FIELD

The embodiments discussed herein are related to an optical waveguide connector.

BACKGROUND

Conventionally, an optical connector which is brought into direct contact with a surface type light emitting element or light receiving element and is shaped by curing resin is known (for example, refer to Japanese Laid-open Patent Publication No. 2005-92160). Further, an optical connector which comes into direct contact with a surface-emitting laser and an optical fiber and whose area in contact with the surface-emitting laser is larger than an area in contact with the optical fiber is known (for example, refer to Japanese Laid-open Patent Publication No. 2005-24813). Furthermore, a technique in which an end surface of an optical fiber is inserted and butted to a substantially spherical concave portion, which is formed on the surface of one side of a flat transparent member, so as to be bonded and fixed is known (for example, refer to Japanese Laid-open Patent Publication No. 2003-329877).

SUMMARY

According to an aspect of the invention, An optical waveguide connector including a surface having an insertion hole that is connectable to a waveguide by inserting an end portion of the optical waveguide, the insertion hole having a bottom surface, the bottom surface being capable of being bonded with an end surface of the optical waveguide by using an adhesive, and a first convex portion located on the bottom surface of the insertion hole, the first convex portion including an incident surface that receives light from the optical waveguide, the incident surface being larger than an end surface of a core of the optical waveguide to be inserted.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

However, in the above-mentioned related art, materials which are usable for an optical connector are limited, for example, so that there is a problem in which it is difficult to enhance the bond strength in a case in which an optical waveguide and an optical connector are bonded with each other with an adhesive interposed therebetween. Further, there is another problem in which it is difficult to suppress degradation in the property of signal light at a bonding portion between the optical waveguide and the optical connector.

In one aspect, it is desirable to provide an optical waveguide connector which is capable of enhancing the bond strength while suppressing degradation in the property of signal light.

An optical waveguide connector according to embodiments of the present application will be described in detail below with reference to the accompanying drawings.

First Embodiment (Optical Waveguide Connector and Optical Waveguide According to First Embodiment)

Figure 1:
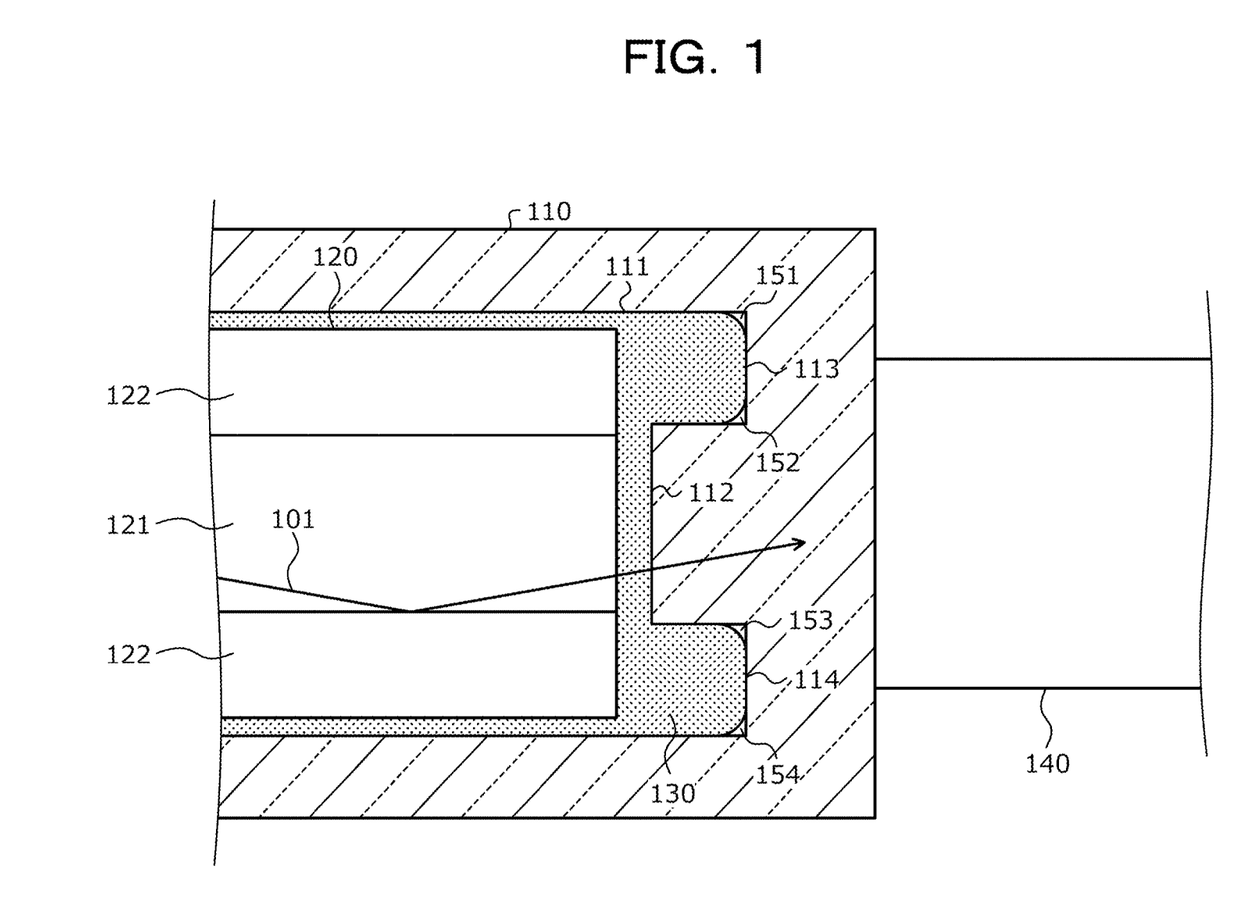
FIG. 1 is a front sectional view illustrating examples of an optical waveguide connector and an optical waveguide according to a first embodiment.

FIG. 1 is a front sectional view illustrating examples of an optical waveguide connector and an optical waveguide according to a first embodiment. As illustrated in FIG. 1, an optical waveguide connector 110 according to the first embodiment connects an optical waveguide 120 and an optical waveguide 140, for example. The optical waveguide 120 is an optical waveguide which is connected to an optical element such as a laser diode (LD) and a photo diode (PD), for example. Further, the optical waveguide 140 is an optical waveguide for optical transmission.

The optical waveguide 120 includes a core 121 and a clad 122. The core 121 is surrounded by the clad 122. Further, the refractive index of the core 121 is higher than that of the clad 122. Light 101 incident on the optical waveguide 120 propagates inside the core 121 while being reflected at a boundary surface between the core 121 and the clad 122. The diameter of the core 121 may be set to be approximately 50 µM, for example. Here, the light 101 is a modulated signal light, for example.

A case in which the light 101 is propagated from the optical waveguide 120 to the optical waveguide 140 through the optical waveguide connector 110 is described in this embodiment. However, light may be propagated from the optical waveguide 140 to the optical waveguide 120 through the optical waveguide connector 110 (for example, refer to FIG. 12).

The optical waveguide connector 110 is formed of a transparent member which transmits the light 101. For example, the optical waveguide connector 110 may be formed of resin such as cyclo-olefin polymer (COP) by using a mold.

Further, the optical waveguide connector 110 includes a slit 111. The slit 111 is an insertion hole (a joining portion) for inserting an end portion of the optical waveguide 120 thereinto. In the slit 111, a surface on which the optical waveguide 120 is abutted when the optical waveguide 120 is inserted (hereinafter, refer to a "bottom surface") may be bonded with an end surface (the right side of the optical waveguide 120 in FIG. 1) of the optical waveguide 120 with an adhesive 130 interposed. Here, in the example illustrated in FIG. 1, a circumference of the end portion (the top and the bottom of the slit 111 in FIG. 1) of the optical waveguide connector 110 as well as the end surface is bonded with the slit 111 with the adhesive 130 interposed.

The optical waveguide 120 is inserted into the slit 111 of the optical waveguide connector 110 so as to be connected with the optical waveguide connector 110 with the adhesive 130 interposed therebetween. For example, the adhesive 130 is poured into the slit 111, the end portion of the optical waveguide 120 is inserted into the slit 111, and the adhesive 130 is cured, thereby being able to connect the optical waveguide 120 to the optical waveguide connector 110 as illustrated in FIG. 1. The adhesive 130 may be cured by irradiating the adhesive 130 with heat or ultraviolet light (UV), for example.

Further, a concavity and a convexity are formed on a portion which is a bottom surface (the right side of the slit 111 in FIG. 1) of the slit 111 of the optical waveguide connector 110 and faces the end surface of the optical waveguide 120. In the example illustrated in FIG. 1, a convex portion 112 and concave portions 113 and 114 are formed as the concavity and the convexity. Accordingly, it is possible to increase a contact area between the adhesive 130 and the optical waveguide connector 110 and enhance the bond strength between the adhesive 130 and the optical waveguide connector 110 compared to a case in which no concavity and convexity are formed on the bottom surface of the slit 111, for example. Here, bubbles 151 to 154 are bubbles (accumulated air) which may be generated at the concave portions 113 and 114 when the adhesive 130 is poured into the slit 111.

Further, the convex portion 112 is provided at a portion, which faces the end surface of the core 121 of the optical waveguide 120, in the bottom surface of the slit 111. Accordingly, the convex portion 112 is capable of transmitting the light 101 which is emitted from the end surface of the core 121 of the optical waveguide 120. The light 101 which is transmitted through the convex portion 112 is emitted from an emitting portion (a right end surface of the optical waveguide connector 110 in FIG. 1) of the optical waveguide connector 110 to the outside of the optical waveguide connector 110.

Further, an incident surface for the light 101 in the convex portion 112 is larger than the end surface of the core 121. The diameter of the convex portion 112 may be set to be approximately +20% with respect to the diameter of the core 121, for example. Thus, it is possible to set the incident surface for the light 101 in the convex portion 112 to include a passing region for the light 101 which is emitted from the end surface of the core 121 of the optical waveguide 120. Accordingly, it is possible to raise a rate of light which is incident on the convex portion 112 in the light 101 which is emitted from the end surface of the core 121 of the optical waveguide 120 and consequently suppress light loss.

Further, the concave portions 113 and 114 are formed at a portion, which faces the clad 122 of the optical waveguide 120, in the bottom surface of the slit 111. Accordingly, it is possible to allow the light 101 which is emitted from the end surface of the core 121 to pass through the convex portion 112 to be incident on the optical waveguide 140 and possible to prohibit the light 101 from passing through the concave portions 113 and 114. Accordingly, it is possible to avoid degradation, which is caused by the bubbles 151 to 154 which may be generated at the concave portions 113 and 114, in the property of the light 101 which is emitted from the core 121. Examples of the degradation of the light 101 caused by the bubbles 151 to 154 include coupling loss caused by Fresnel loss.

(Optical Waveguide Connector with Lens and Optical Waveguide According to First Embodiment)

Figure 2:
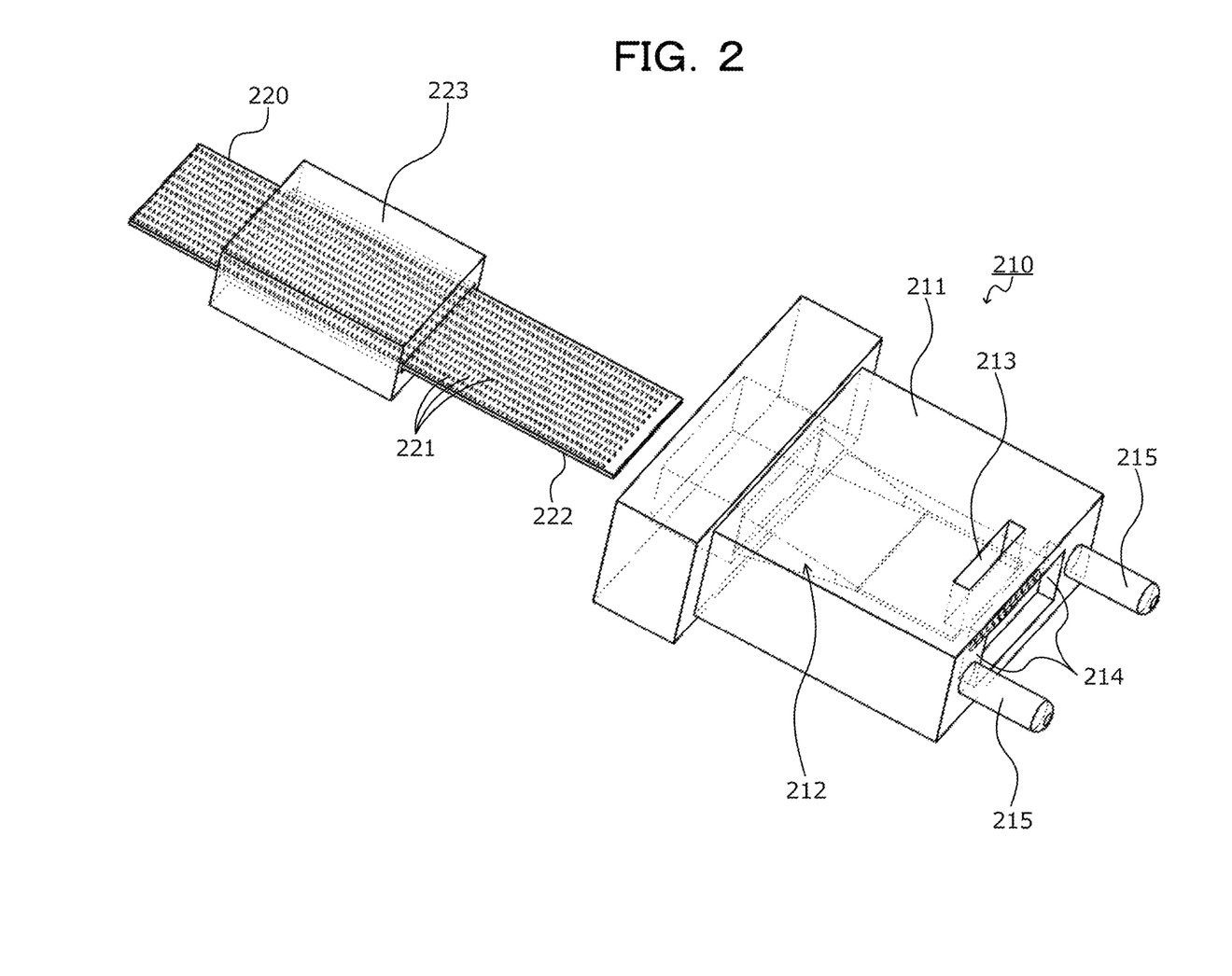
FIG. 2 is a perspective view illustrating examples of an optical waveguide connector with lens and an optical waveguide according to the first embodiment.

FIG. 2 is a perspective view illustrating examples of an optical waveguide connector with lens and an optical waveguide according to the first embodiment. An optical waveguide connector with lens 210 illustrated in FIG. 2 corresponds to the optical waveguide connector 110 illustrated in FIG. 1. An optical waveguide 220 illustrated in FIG. 2 corresponds to the optical waveguide 120 illustrated in FIG. 1. That is, the optical waveguide connector with lens 210 connects the optical waveguide 220 and an optical waveguide which is different from the optical waveguide 220.

The optical waveguide 220 includes a core group 221 and a clad 222. The core group 221 corresponds to the core 121 illustrated in FIG. 1 and includes a plurality of cores which are provided on an array. The clad 222 corresponds to the clad 122 illustrated in FIG. 1 and is formed to surround the core group 221. Further, the refractive index of the core group 221 is higher than that of the clad 222. Accordingly, it is possible to propagate light in each core included in the core group 221. Further, a ferrule boot 223 which sandwiches the optical waveguide 220 is provided to the optical waveguide 220.

The optical waveguide connector with lens 210 includes a connector body 211, a slit 212, an air hole 213, a lens array 214, and pins 215. The connector body 211, the slit 212, the air hole 213, the lens array 214, and the pins 215 may be integrally formed of transparent resin such as COP by using a mold. The connector body 211 corresponds to a body portion of the optical waveguide connector 110 illustrated in FIG. 1. The connector body 211 transmits light emitted from the core group 221 to emit the light to the lens array 214.

The slit 212 corresponds to the slit 111 illustrated in FIG. 1 and is an insertion hole for inserting the optical waveguide 220 thereinto. The air hole 213 is a hole which connects a portion around a bottom surface of the slit 212 and a surface of the connector body 211. Due to the air hole 213, air in the slit 212 goes to the outside when an adhesive is poured into the slit 212 and the end portion of the optical waveguide 220 is inserted, thereby being able to reduce generation of largely-accumulated air.

The lens array 214 includes a plurality of lenses which are provided in an array to correspond to respective cores in the core group 221 of the optical waveguide 220 which is inserted into the slit 212. Each lens included in the lens array 214 condenses light which is emitted from an end surface of each corresponding core included in the core group 221 and is transmitted through the connector body 211. Each beam of light which is condensed by the lens array 214 is emitted to the outside (for example, the optical waveguide 140 illustrated in FIG. 1) of the optical waveguide connector with lens 210.

The pin 215 is used for positioning and fixing the connector body 211 with respect to an optical component (the optical waveguide 140 illustrated in FIG. 1, for example) which is connected with the optical waveguide 220 through the optical waveguide connector with lens 210. In the example illustrated in FIG. 2, two pins 215 are provided.

(State in which Optical Waveguide is Connected to Optical Waveguide Connector with Lens According to First Embodiment)

Figure 3:
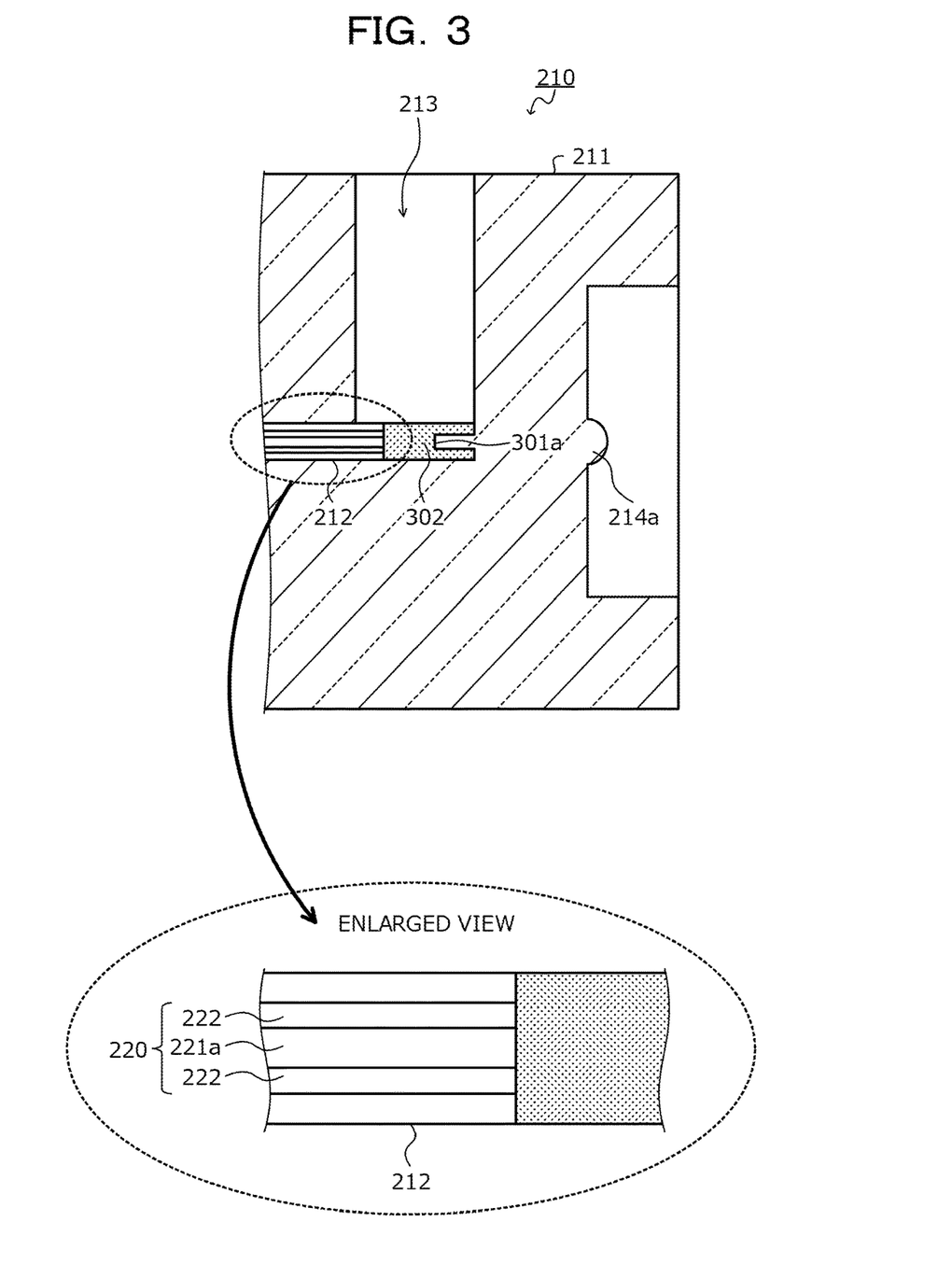
FIG. 3 is a front sectional view illustrating a state in which the optical waveguide is connected to the optical waveguide connector with lens according to the first embodiment.

FIG. 3 is a front sectional view illustrating a state in which the optical waveguide is connected to the optical waveguide connector with lens according to the first embodiment. In FIG. 3, portions same as the portions illustrated in FIG. 2 are given reference characters identical to those in FIG. 2 and descriptions thereof are omitted. An adhesive 302 bonds the bottom surface of the slit 212 and the end surface of the optical waveguide 220.

A core 221a is one of the cores included in the core group 221 illustrated in FIG. 2. A lens 214a is one of the lenses included in the lens array 214 illustrated in FIG. 2. Light which passes through the core 221a is emitted from the end surface of the core 221a, passes through the connector body 211, and is condensed by the lens 214a so as to be emitted to the outside of the optical waveguide connector with lens 210.

For example, the adhesive 302 which is in liquid form is poured to the bottom surface of the slit 212, the end portion of the optical waveguide 220 is inserted toward the bottom surface of the slit 212, and the adhesive 302 is cured so as to be able to bond the bottom surface of the slit 212 with the end portion of the optical waveguide 220. The adhesive 302 may be poured from an opening portion, into which the optical waveguide 220 is inserted, of the slit 212 (the left side of the slit 212 in FIG. 2) or from the air hole 213.

Further, in a similar manner to the optical waveguide connector 110 illustrated in FIG. 1, a convex portion group (for example, a convex portion group 301 illustrated in FIG. 4) is formed on the bottom surface of the slit 212 and thus, the slit 212 has a concavo-convex shape on the bottom surface thereof. A convex portion 301a illustrated in FIG. 3 is one of convex portions included in the convex portion group (for example, refer to FIG. 4) provided on the bottom surface of the slit 212. Accordingly, it is possible to increase a contact area between the adhesive 302 and the connector body 211 and enhance the bond strength between the adhesive 302 and the connector body 211. Here, a portion, on which a convex portion (the convex portion 301a) is not provided, in the bottom surface of the slit 212 is referred to as a concave portion.

Further, the convex portion 301a is provided on a portion, which faces the core 221a of the optical waveguide 220, in the bottom surface of the slit 212. Accordingly, it is possible to allow light which is emitted from the core 221a to pass through the convex portion 301a and possible to prohibit the light from passing through the concave portions on the bottom surface of the slit 212. Accordingly, it is possible to avoid degradation, which is caused by bubbles which may be generated at the concave portions when the adhesive 302 is poured into, in the property of the light which is emitted from the core 221a.

(Optical Waveguide Connector with Lens According to First Embodiment)

Figure 4:
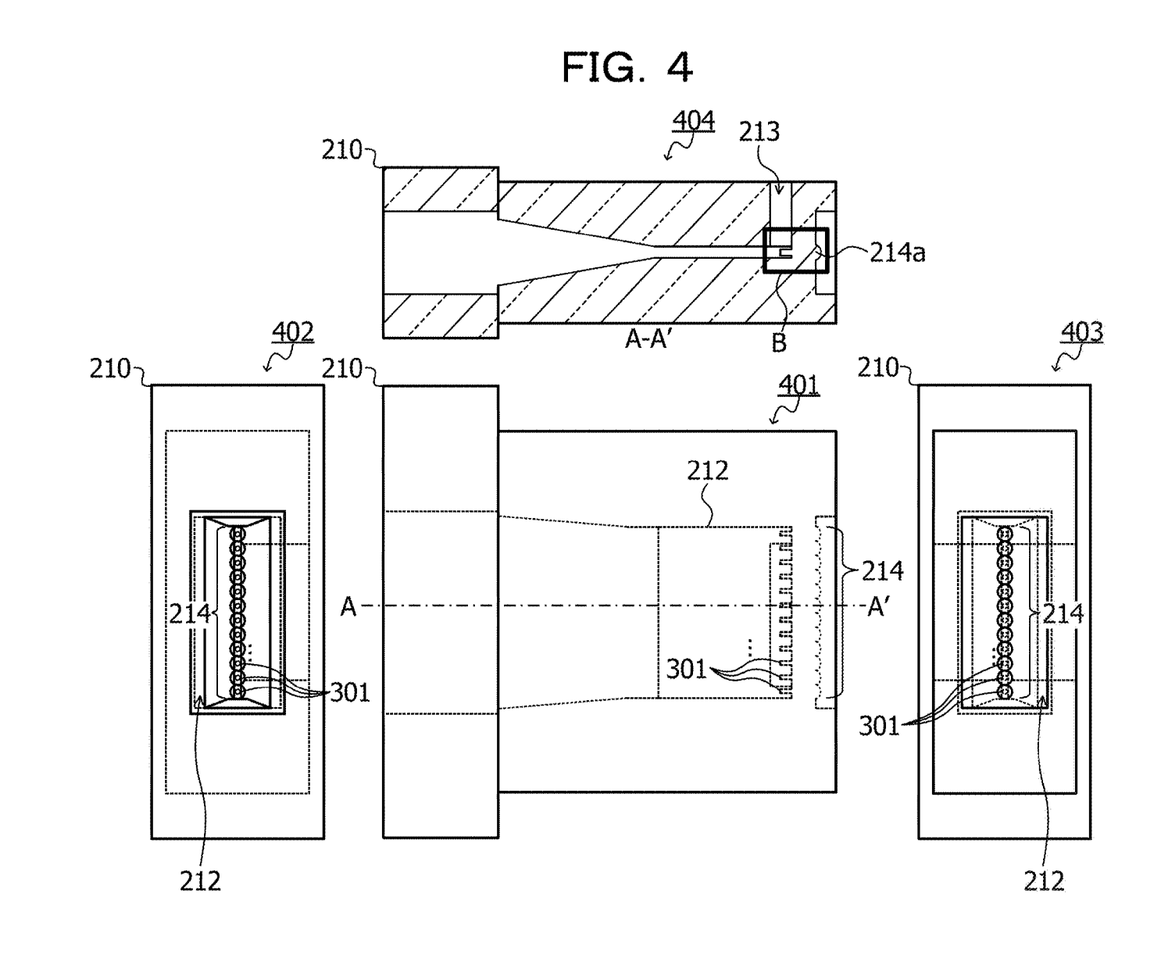
FIG. 4 is a diagram (I) illustrating an example of the optical waveguide connector with lens according to the first embodiment.
Figure 5:
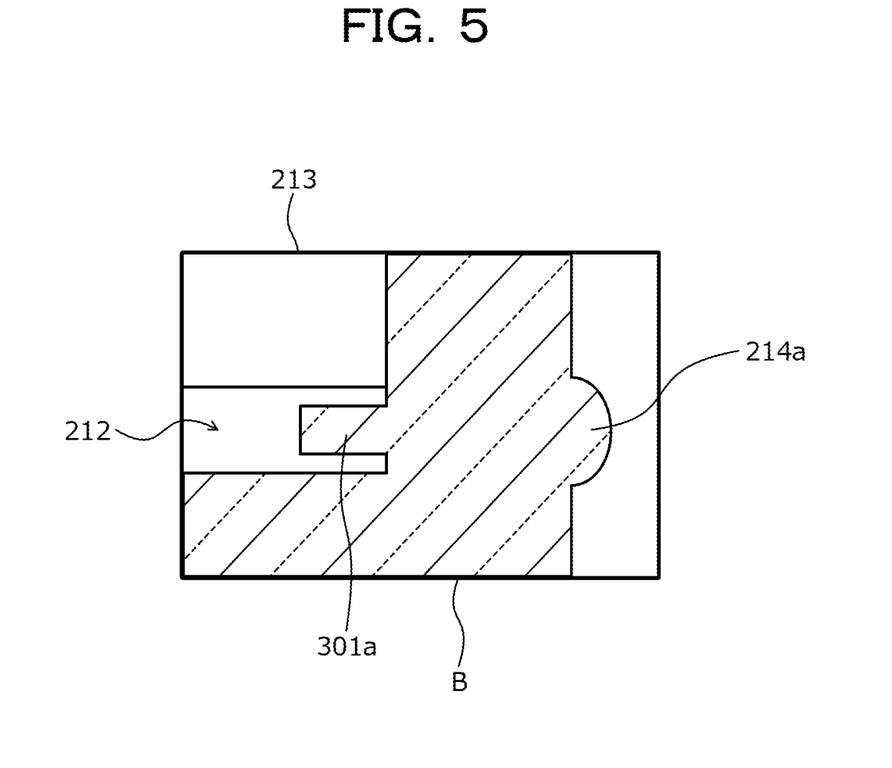
FIG. 5 is a diagram (II) illustrating an example of the optical waveguide connector with lens according to the first embodiment.

FIGS. 4 and 5 illustrate an example of the optical waveguide connector with lens according to the first embodiment. In FIGS. 4 and 5, portions same as the portions illustrated in FIGS. 2 and 3 are given reference characters identical to those in FIGS. 2 and 3 and descriptions thereof are omitted. Here, illustration of the pin 215 is omitted in FIG. 4.

A plan view 401 and lateral views 402 and 403 in FIG. 4 respectively illustrate a planar surface and both lateral surfaces of the optical waveguide connector with lens 210 illustrated in FIGS. 2 and 3. A front sectional view 404 is an A-A' section in the plan view 401. In FIG. 5, a region V in the front sectional view 404 is illustrated in an enlarged manner.

As illustrated in FIGS. 4 and 5, the convex portion group 301 which is constituted of convex portions corresponding to respective lenses included in the lens array 214 is provided on the bottom surface of the slit 212. Each convex portion of the convex portion group 301 may be set to have various shapes such as a square column and a cylindrical column. Each beam of light which is emitted from the core group 221 of the optical waveguide 220 inserted into the slit 212 passes through corresponding convex portion of the convex portion group 301 and is condensed by corresponding lens included in the lens array 214 so as to be emitted.

Thus, according to the optical waveguide connector of the first embodiment, the concavity and the convexity are provided on the bottom portion of the insertion hole of the connector, to which the end portion of the optical waveguide is inserted, so as to be able to increase a contact area between the adhesive, which bonds the optical waveguide with the connector, and the connector. Accordingly, it is possible to enhance the bond strength between the adhesive and the connector.

Even in a case in which materials usable for an optical connector are limited such as a case in which a body and a lens of an optical connector are integrally formed as the optical waveguide connector with lens 210, it is possible to enhance the bond strength by providing a concavity and a convexity on a bottom surface of an insertion hole of the connector. Further, it is possible to enhance the bond strength even by using a general purpose adhesive for adhesion between an optical waveguide and a connector. Thus, it is possible to enhance the flexibility of design.

Further, a concavity and a convexity are provided so that a convex portion faces the end surface of the core of the optical waveguide, that is, so that a concave portion faces the end surface of the clad of the optical waveguide, thereby being able to allow signal light propagating through the core to pass through the convex portion and to prohibit the signal light from passing through the concave portion. Accordingly, it is possible to suppress degradation in the property of signal light caused by bubbles, which are generated at the concave portion, of the adhesive.

Second Embodiment

A part different from the first embodiment will be described as to a second embodiment. In the second embodiment, the configuration will be described in which a concavo-convex portion including a convex portion which faces a clad of an optical waveguide as well as a convex portion which faces a core of the optical waveguide is provided.

(Optical Waveguide Connector and Optical Waveguide According to Second Embodiment)

Figure 6:
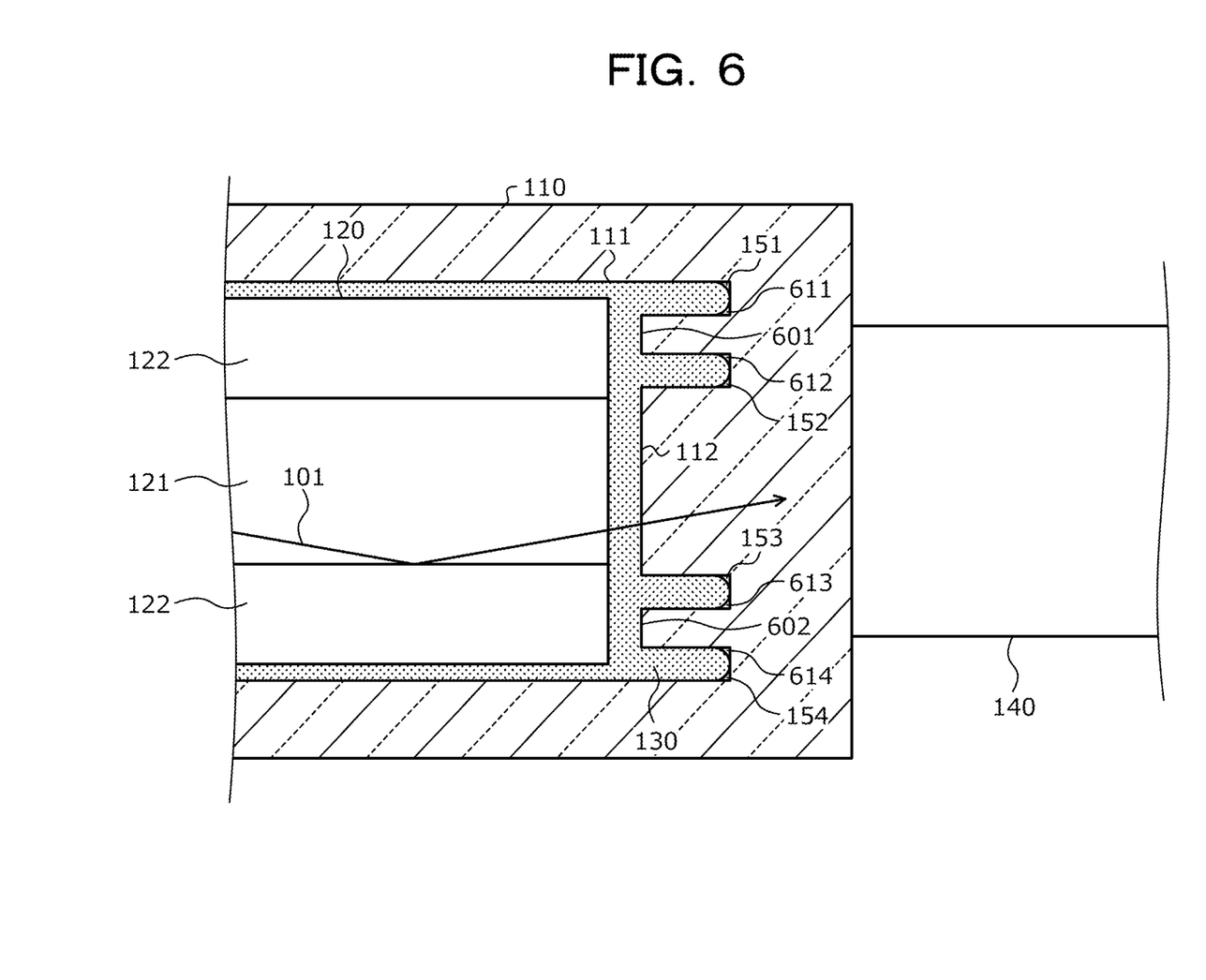
FIG. 6 is a front sectional view illustrating examples of an optical waveguide connector and an optical waveguide according to a second embodiment.

FIG. 6 is a front sectional view illustrating examples of an optical waveguide connector and an optical waveguide according to the second embodiment. In FIG. 6, portions same as the portions illustrated in FIG. 1 are given reference characters identical to those in FIG. 1 and descriptions thereof are omitted. As illustrated in FIG. 6, on the bottom surface of the slit 111 in the optical waveguide connector 110 according to the second embodiment, convex portions 601 and 602 which face the clad 122 are provided in addition to the convex portion 112 which is provided to face the core 121. Accordingly, it is possible to further increase a contact area between the adhesive 130 and the optical waveguide connector 110 and enhance the bond strength between the adhesive 130 and the optical waveguide connector 110.

Further, due to the provision of the convex portions 601 and 602, bubbles 611 to 614 may be generated around the convex portions 601 and 602, in addition to the bubbles 151 to 154 illustrated in FIG. 1. However, the light 101 does not pass near the convex portions 601 and 602 of the slit 111, thereby being able to avoid degradation in the property of the light 101 caused by the bubbles 611 to 614.

(Optical Waveguide Connector with Lens and Optical Waveguide According to Second Embodiment)

Figure 7:
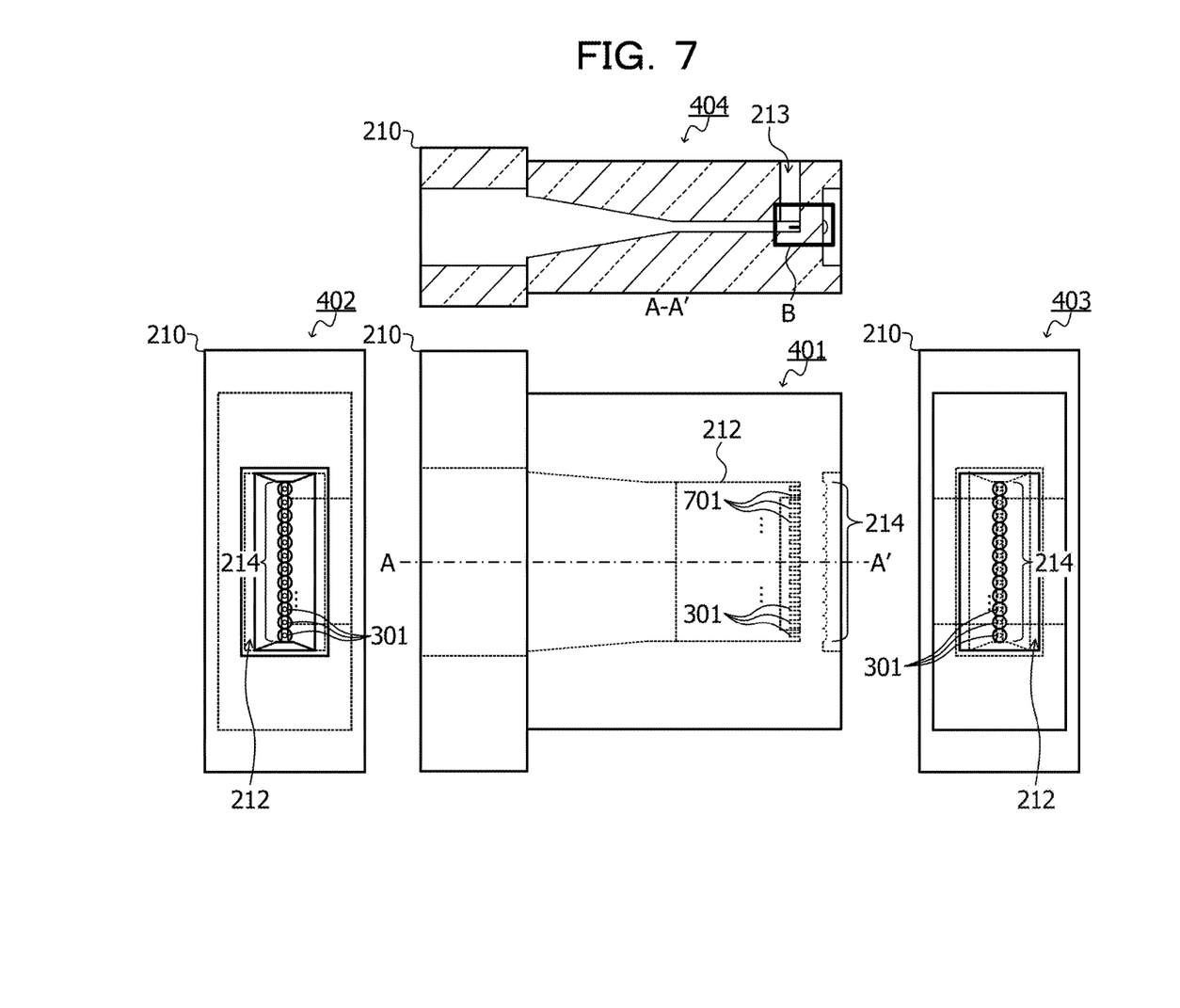
FIG. 7 is a perspective view (I) illustrating examples of an optical waveguide connector with lens and an optical waveguide according to the second embodiment.
Figure 8:
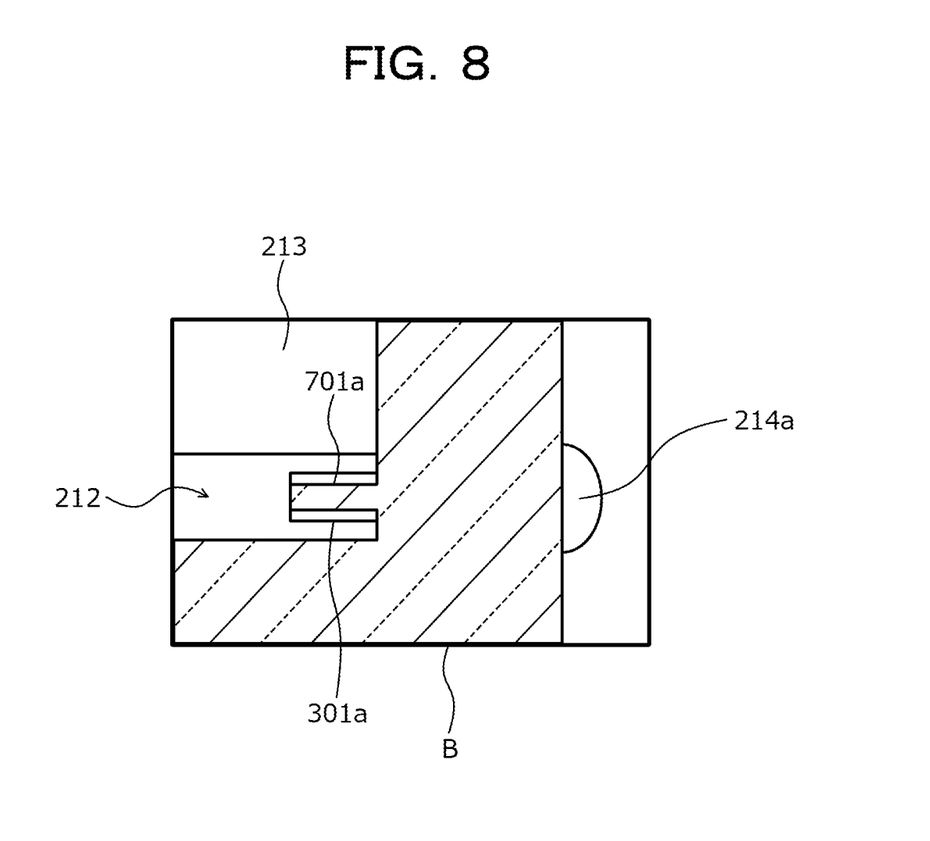
FIG. 8 is a perspective view (II) illustrating examples of the optical waveguide connector with lens and the optical waveguide according to the second embodiment.

FIGS. 7 and 8 are perspective views illustrating examples of an optical waveguide connector with lens and an optical waveguide according to the second embodiment. In FIGS. 7 and 8, portions same as the portions illustrated in FIGS. 2 to 5 are given reference characters identical to those in FIGS. 2 to 5 and descriptions thereof are omitted. In FIG. 8, a region VIII in the front sectional view 404 of FIG. 7 is illustrated in an enlarged manner.

As illustrated in FIGS. 7 and 8, on the bottom surface of the slit 212 in the second embodiment, a convex portion group 701 is provided in addition to the convex portion group 301 whose convex portions respectively correspond to lenses included in the lens array 214. Convex portions of the convex portion group 701 are provided on positions different from those for the convex portions of the convex portion group 301. In the example illustrated in FIGS. 7 and 8, the convex portion group 301 and the convex portion group 701 are provided so that the convex portions of the convex portion group 301 and the convex portions of the convex portion group 701 are alternately arranged.

Each of the convex portions of the convex portion group 701 may be set to have various shapes such as a square column and a cylindrical column as is the case with the convex portion group 301. Further, in the example illustrated in FIGS. 7 and 8, each convex portion of the convex portion group 701 is formed to have the diameter smaller than that of each convex portion of the convex portion group 301.

In the optical waveguide connector with lens 210 according to the second embodiment as well, each beam of light which is emitted from the core group 221 of the optical waveguide 220 inserted into the slit 212 passes through corresponding convex portion of the convex portion group 301 and does not pass through the convex portions of the convex portion group 701.

A convex portion 701a illustrated in FIG. 8 is one of the convex portions included in the convex portion group 701 illustrated in FIG. 7. Further, the convex portion 701a is provided on a position, which does not face the lens (for example, the lens 214a) of the lens array 214, in the bottom surface of the slit 212.

Thus, according to the optical waveguide connector of the second embodiment, it is possible to enhance the bond strength while suppressing degradation in the property of signal light, as is the case with the optical waveguide connector according to the first embodiment. Further, according to the optical waveguide connector of the second embodiment, the concavo-convex portion including the convex portion which faces the clad of the optical waveguide in addition to the convex portion which faces the core of the optical waveguide is provided, thereby being able to increase the contact area between the adhesive and the connector. Accordingly, it is possible to enhance the bond strength between the adhesive and the connector.

Third Embodiment

A part different from the first embodiment will be described as a third embodiment. In the third embodiment, the configuration in which a convex portion in a slit of a connector is used as an optical waveguide will be described.

(Propagation of Light in Optical Waveguide Connector and Optical Waveguide According to Third Embodiment)

Figure 9:
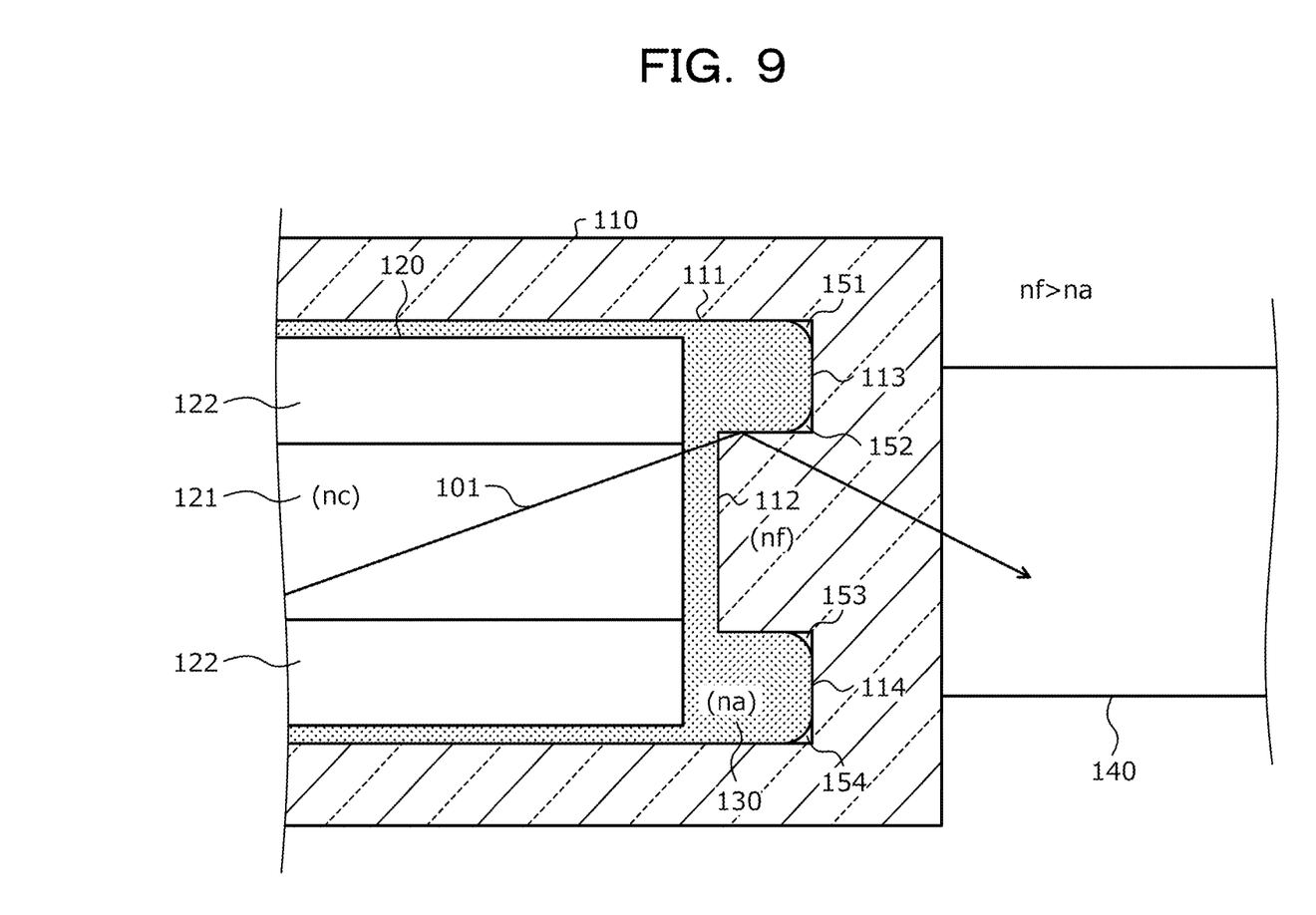
FIG. 9 is a front sectional view illustrating an example of propagation of light in an optical waveguide connector and an optical waveguide according to a third embodiment.

FIG. 9 is a front sectional view illustrating an example of propagation of light in an optical waveguide connector and an optical waveguide according to a third embodiment. In FIG. 9, portions same as the portions illustrated in FIG. 1 are given reference characters identical to those in FIG. 1 and descriptions thereof are omitted. na, nc, and nf illustrated in FIG. 9 denote refractive indices of the adhesive 130, the core 121, and the optical waveguide connector 110 respectively.

In this case, materials of the optical waveguide connector 110 and the adhesive 130 are selected so that nf>na is satisfied. That is, an adhesive having the refractive index which is smaller than that of the optical waveguide connector 110 is used as the adhesive 130. It is assumed that a wavelength of the light 101 is 850 nm and COP is used for the optical waveguide connector 110 as described above, for example. In this case, the refractive index nc of the core 121 may be set to be 1.56, the refractive index na of the adhesive 130 may be set to be 1.50, and the refractive index nf of the optical waveguide connector 110 may be set to be 1.51, for example.

Accordingly, the light 101 which is emitted from the end surface of the core 121 to be incident on the convex portion 112 is allowed to propagate through the inside of the convex portion 112 while being reflected at the boundary surface between the convex portion 112 and the adhesive 130. Thus, it is possible to enhance the confinement efficiency of the light 101 by using the concavity and the convexity which are formed by the convex portion 112.

(Condensation of Light by Optical Waveguide Connector According to Third Embodiment)

Figure 10:
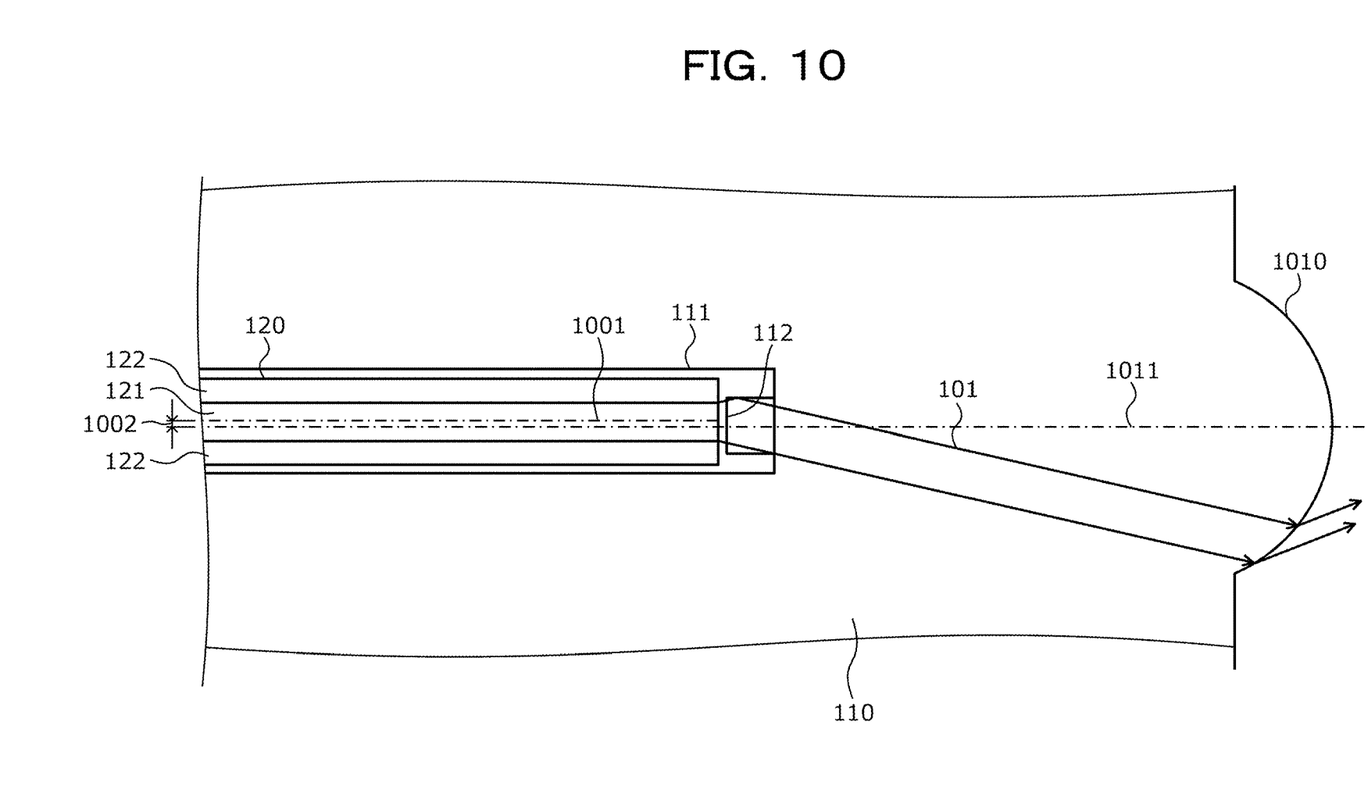
FIG. 10 is a front sectional view illustrating an example of condensation of light performed by the optical waveguide connector according to the third embodiment.

FIG. 10 is a front sectional view illustrating an example of condensation of light performed by the optical waveguide connector according to the third embodiment. In FIG. 10, portions same as the portions illustrated in FIG. 9 are given reference characters identical to those in FIG. 9 and descriptions thereof are omitted. In the example illustrated in FIG. 10, a case will be described in which light which is emitted from the end surface of the core 121 to pass through the convex portion 112 is condensed by a lens 1010 and is emitted to the outside of the optical waveguide connector 110. In this case, the lens 1010 corresponds to the lens array 214 illustrated in FIG. 2, for example.

A lens center 1011 represents the center of the lens 1010. A core center 1001 represents the center of the core 121. In the example illustrated in FIG. 10, a gap 1002 (for example, approximately 4 mm) is generated between the lens center 1011 and the core center 1001. The gap 1002 is generated when the position of the optical waveguide 120 is shifted in the inside of the slit 111, for example.

Provisionally, a case in which confinement of the light 101 by using the concavity and the convexity which are formed by the convex portion 112 is not performed (a case in which the convex portion 112 is not provided, for example) is described. In this case, due to the generation of the gap 1002, part of the light 101 is not incident on the lens 1010 to generate light loss depending on a spreading angle of the light 101 which is emitted from the end surface of the core 121 and is diffused.

On the other hand, when the light 101 is confined by using the concavity and the convexity which are formed by the convex portion 112, it is possible to condense the light 101, which is emitted from the end surface of the core 121 and is diffused, onto the lens 1010 even if the gap 1002 is generated as illustrated in FIG. 10.

Thus, the concavity and the convexity which are formed by the convex portion 112 are used as an optical waveguide, thereby being able to enhance the confinement efficiency of the light 101. Accordingly, flexible design such as reduction in size of the lens 1010 is enabled.

(Example of Relationship Among Refractive Indices of Core and Adhesive According to Third Embodiment)

Figure 11:
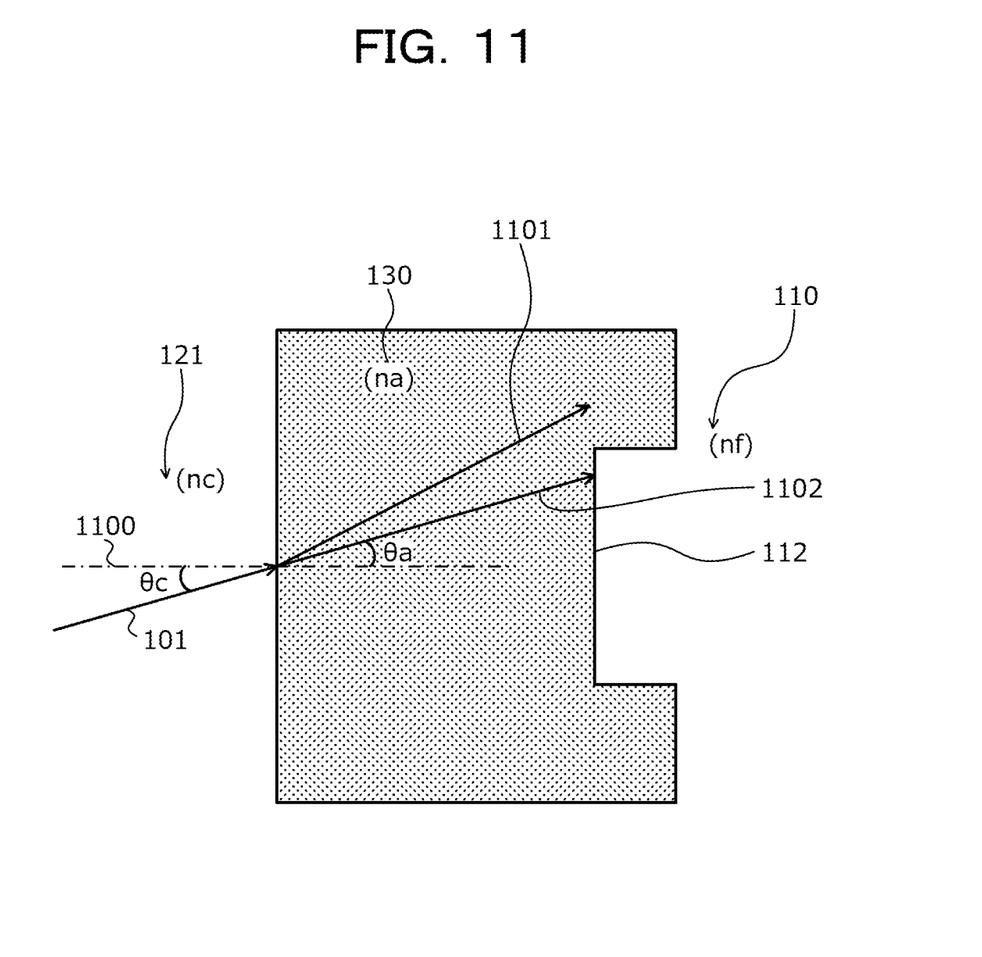
FIG. 11 illustrates an example of a relationship among refractive indices of a core and an adhesive according to the third embodiment.

FIG. 11 illustrates an example of the relationship among refractive indices of the core and the adhesive according to the third embodiment. In FIG. 11, portions same as the portions illustrated in FIGS. 9 and 10 are given reference characters identical to those in FIGS. 9 and 10 and descriptions thereof are omitted. θc denotes an angle (incident angle) formed by a reference direction 1100 which is orthogonal to the boundary surface between the core 121 and the adhesive 130 and a direction of the light 101 which propagates through the core 121 to be incident on the adhesive 130.

A light traveling direction 1101 is a traveling direction of the light 101 which is incident on the adhesive 130 from the core 121 and passes through the adhesive 130 in a case in which the refractive index nc of the core 121 is lower than the refractive index na of the adhesive 130 (nc<na). A light traveling direction 1102 is a traveling direction of the light 101 which is incident on the adhesive 130 from the core 121 and passes through the adhesive 130 in a case in which the refractive index nc of the core 121 is higher than the refractive index na of the adhesive 130 (nc>na).

As illustrated by the light traveling directions 1101 and 1102, when the refractive index nc of the core 121 is set to be higher than the refractive index na of the adhesive 130 (nc>na), it is possible to reduce the angle θa between the direction of the light 101 which passes through the adhesive 130 and the reference direction 1100. Accordingly, it is possible to increase the tolerance of displacement between the optical waveguide 120 and the convex portion 112.

Therefore, the refractive indices na, nc, and nf of the adhesive 130, the core 121, and the optical waveguide connector 110 are set to be nc>nf>na, for example. However, the relationship between the refractive index nc of the core 121 and the refractive index na of the adhesive 130 and the relationship between the refractive index nc of the core 121 and the refractive index nf of the optical waveguide connector 110 are not limited to this, but the relationships may be changed depending on the design.

Thus, according to the optical waveguide connector of the third embodiment, it is possible to enhance the bond strength while suppressing degradation in the property of signal light, as is the case with the optical waveguide connector according to the first embodiment. Further, according to the optical waveguide connector of the third embodiment, the refractive index of the convex portion which is provided to face the core is set to be higher than the refractive index of the adhesive and thus, the light is allowed to be reflected at the boundary surface between the convex portion and the adhesive and be transmitted through the convex portion, enabling reduction in light loss. Accordingly, it is possible to suppress degradation in the property of signal light.

Here, though the part different from the first embodiment is described as to the third embodiment, the third embodiment may employ the configuration in which a concavo-convex portion which includes a convex portion facing the clad of the optical waveguide as well as the convex portion facing the core of the optical waveguide is provided as is the case with the second embodiment, for example.

Fourth Embodiment

A part different from the first embodiment will be described as to a fourth embodiment. Though the configuration in which light is propagated from the optical waveguide 120 to the optical waveguide connector 110 is described in each above-mentioned embodiment, the configuration in which light is propagated from the optical waveguide connector 110 to the optical waveguide 120 is described in the fourth embodiment.

(Optical Waveguide Connector and Optical Waveguide According to Fourth Embodiment)

Figure 12:
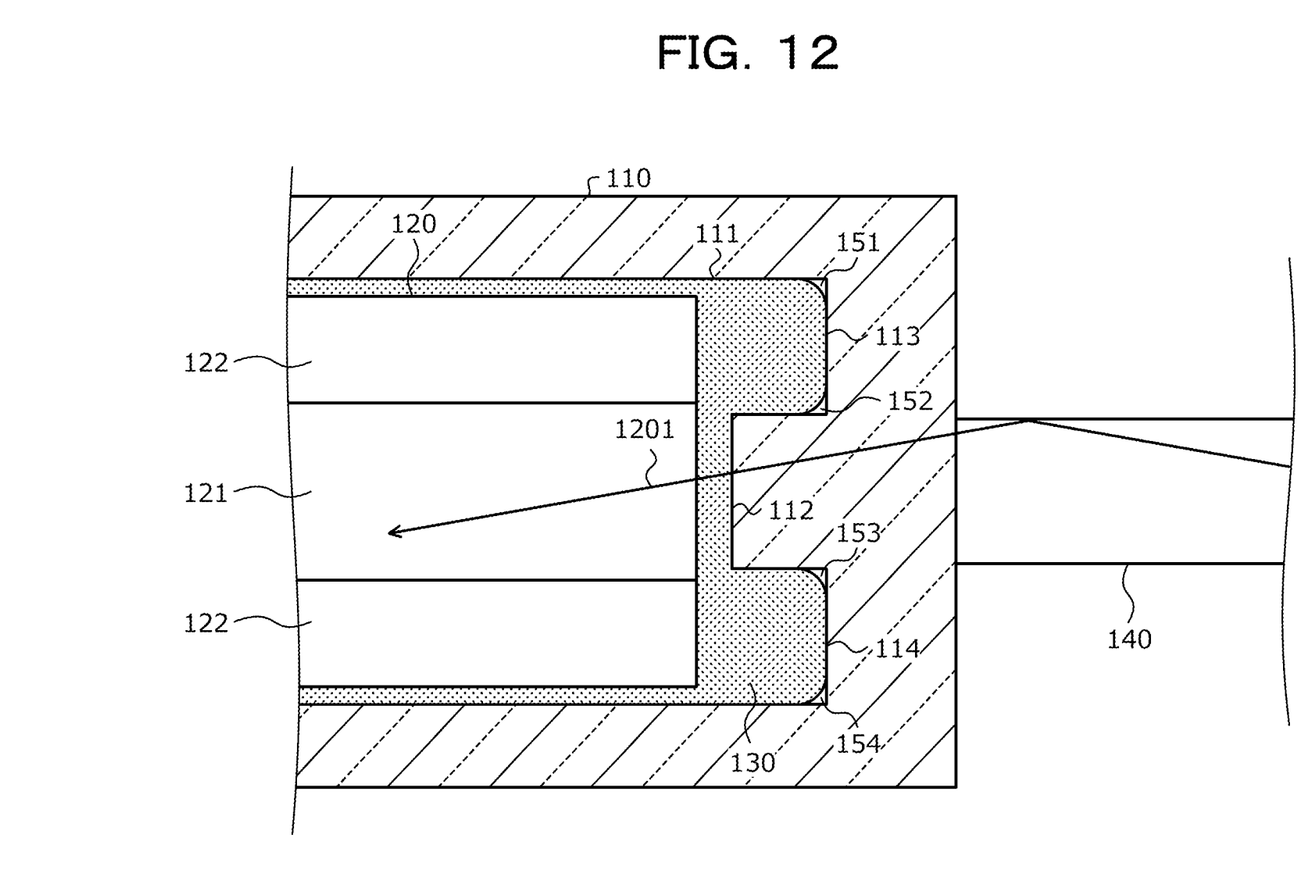
FIG. 12 is a front sectional view illustrating examples of an optical waveguide connector and an optical waveguide according to a fourth embodiment.

FIG. 12 is a front sectional view illustrating examples of an optical waveguide connector and an optical waveguide according to the fourth embodiment. In FIG. 12, portions same as the portions illustrated in FIG. 1 are given reference characters identical to those in FIG. 1 and descriptions thereof are omitted. As illustrated in FIG. 12, light 1201 which is emitted from the optical waveguide 140 is incident on an incident portion (a right end surface of the optical waveguide connector 110 in FIG. 12) of the optical waveguide connector 110 according to the fourth embodiment.

The light 1201 incident on the optical waveguide connector 110 passes through the convex portion 112 and the adhesive 130 to be incident on the end surface of the core 121 of the optical waveguide 120.

In this case, an emission surface (a left end surface of the convex portion 112 in FIG. 12) for the light 1201 in the convex portion 112 is smaller than the end surface of the core 121. The diameter of the convex portion 112 may be set to be approximately −20% with respect to the diameter of the core 121, for example. Thus, it is possible to set the end surface of the core 121 of the optical waveguide 120 to include a passing region for the light 1201 which is emitted from the convex portion 112. Accordingly, it is possible to raise a rate of light which is incident on the end surface of the core 121 of the optical waveguide 120 in the light 1201 which is emitted from the convex portion 112 and suppress light loss.

Thus, according to the optical waveguide connector of the fourth embodiment, it is possible to enhance the bond strength while suppressing degradation in the property of signal light also in the configuration in which light is propagated from the optical waveguide connector 110 to the optical waveguide 120, as is the case with the optical waveguide connector according to the first embodiment.

Here, though the part different from the first embodiment is described as to the fourth embodiment, the fourth embodiment may employ the configuration in which a concavo-convex portion which includes a convex portion facing the clad of the optical waveguide as well as the convex portion facing the core of the optical waveguide is provided as is the case with the second embodiment, for example. Further, the fourth embodiment may employ the configuration in which the refractive index of the convex portion which is provided to face the core is set to be higher than the refractive index of the adhesive as is the case with the third embodiment, for example.

As illustrated above, according to the optical waveguide connector, it is possible to enhance the bond strength while suppressing degradation in the property of signal light.

For example, optical waveguide connectors with lens conventionally have had conditions for a material applicable thereto, such as heat moisture resistance and transparency with respect to an applicable wavelength, and thus, the material thereof is sometimes limited. Therefore, there are few general purpose adhesives which have high bond strength to be suitable for the material of the optical waveguide connector. Further, development of a special adhesive which has high bond strength to be suitable for the optical waveguide connector with lens costs much.

On the other hand, according to the above-described each embodiment, such configuration may be employed that a concavity and a convexity are provided on the bottom surface, which is bonded with the end surface of the optical waveguide with the adhesive, of the insertion hole of the optical waveguide connector so that the convex portion faces the core of the optical waveguide. Accordingly, it is possible to avoid degradation in the property of light caused by bubbles of the adhesive, which are generated on concave portions, while enhancing the bond strength between the adhesive and the optical waveguide connector.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical waveguide connector comprising:
a connector body having an insertion hole that is connectable to an optical waveguide by inserting an end portion of the optical waveguide, the optical waveguide including a core and a clad that surrounds the core, the insertion hole having a bottom surface, the bottom surface being configured to be bonded to the end portion of the optical waveguide with an adhesive interposed between the bottom surface and the end portion; and
a first convex portion provided on the bottom surface of the insertion hole so that the first convex portion faces the core of the optical waveguide when the optical waveguide is inserted, the first convex portion including an incident surface that receives light from the optical waveguide, the incident surface being larger than an end surface of the core of the optical waveguide to be inserted.

2. The optical waveguide connector according to claim 1, further comprising:
a second convex portion provided on the bottom surface of the insertion hole so that the second convex portion faces the clad of the optical waveguide; and
a concave portion provided on the bottom surface of the insertion hole, the concave portion being located between the first convex portion and the second convex portion.

3. The optical waveguide connector according to claim 1, wherein a refractive index of the first convex portion is higher than a refractive index of the adhesive.

4. The optical waveguide connector according to claim 3, wherein the first convex portion is capable of transmitting the light by reflecting the light at a boundary surface between the first convex portion and the adhesive, the boundary surface being different from the incident surface.

5. The optical waveguide connector according to claim 1, further comprising:
a lens which is formed integrally with the first convex portion; wherein
light which is emitted from the end surface of the core to be transmitted through the first convex portion is emitted through the lens or light which is incident through the lens to be transmitted through the first convex portion is emitted to the end surface of the core.

6. An optical waveguide connector comprising:
a connector body having an insertion hole that is connectable to an optical waveguide by inserting an end portion of the optical waveguide, the optical waveguide including a core and a clad that surrounds the core, the insertion hole having a bottom surface, the bottom surface being configured to be bonded to the end portion of the optical waveguide with an adhesive interposed between the bottom surface and the end portion; and
a first convex portion provided on the bottom surface of the insertion hole so that the first convex portion faces the core of the optical waveguide when the optical waveguide is inserted, the first convex portion including an incident surface that receives light from the optical waveguide, the incident surface being smaller than an end surface of the core of the optical waveguide to be inserted and being smaller than an end surface of the optical waveguide.

7. The optical waveguide according to claim 2, wherein both the first convex portion and the second convex portion project toward the end surface of the optical waveguide from the bottom surface.

8. The optical waveguide connector according to claim 1, wherein the first convex portion is configured to be bonded with the end portion of the optical waveguide with the adhesive interposed.

* * * * *